(12) United States Patent
Dobson

(10) Patent No.: US 8,136,335 B2
(45) Date of Patent: Mar. 20, 2012

(54) BRASSICA HARVESTER

(75) Inventor: Philip Ross Dobson, Penguin (AU)

(73) Assignee: Dobson's Vegetable Machinery PTY Ltd., Ulverstone, Tasmania (AU)

( * ) Notice: Subject to any disclaimer, the term of this patent is extended or adjusted under 35 U.S.C. 154(b) by 28 days.

(21) Appl. No.: 12/869,289

(22) Filed: Aug. 26, 2010

(65) Prior Publication Data

US 2011/0047954 A1   Mar. 3, 2011

(30) Foreign Application Priority Data

Aug. 26, 2009   (AU) ............................... 2009904110

(51) Int. Cl.
*A01D 45/00*   (2006.01)
(52) U.S. Cl. ....................................... 56/327.1
(58) Field of Classification Search ................. 56/327.1, 56/121.4, 121.41, 121.42, 153
See application file for complete search history.

(56) References Cited

U.S. PATENT DOCUMENTS

| | | | | |
|---|---|---|---|---|
| 2,588,764 | A | * | 3/1952 | Richmond .................... 56/327.1 |
| 3,380,234 | A | * | 4/1968 | Garrett .......................... 56/327.1 |
| 3,380,237 | A | * | 4/1968 | Garrett .......................... 56/327.1 |
| 3,390,768 | A | * | 7/1968 | Button .......................... 209/665 |
| 3,415,045 | A | * | 12/1968 | Hibbard ........................... 56/153 |
| 3,426,515 | A | * | 2/1969 | Boyer .......................... 56/327.1 |
| 3,485,023 | A | | 12/1969 | See |
| 3,497,013 | A | | 2/1970 | Baker |

(Continued)

FOREIGN PATENT DOCUMENTS

DE   3338563   6/1984

(Continued)

OTHER PUBLICATIONS

International-Type Search Report from Corresponding Australian Application No. 2009904110 dated Apr. 8, 2010.

(Continued)

*Primary Examiner* — Thomas Will
*Assistant Examiner* — Joan Misa
(74) *Attorney, Agent, or Firm* — McDermott Will & Emery LLP

(57) ABSTRACT

A harvester for *brassicas*, the harvester being movable along a plant row and comprising an endless conveyor orientated in the direction of the plant row, the conveyor being of generally tubular form defined by opposed rows of arcuate conveyor fingers movable from an open condition in which free ends of the opposed fingers are spaced so as to define a generally tubular configuration which is open at one side to a closed condition in which the free ends of the opposed fingers are adjacent to define a generally closed tubular configuration, the conveyor having an upper run and a lower run, the conveyor being configured at its forward end portion so that the fingers are in their open condition during transition from the upper run to the lower run and move downwardly onto a plant to be harvested so as to move foliage away from the plant head and to allow the plant head to enter the interior of the conveyor through the open side, with the fingers then moving to a closed condition to thereby capture the plant head with the interior of the conveyor, the harvester further comprising means for cutting the plant stem whereby the plant head severed from the remainder of the plant can be carried by the conveyor for discharge from the conveyor when the fingers by which the head has been retained are returned to their open condition.

14 Claims, 12 Drawing Sheets

U.S. PATENT DOCUMENTS

| | | | |
|---|---|---|---|
| 3,548,950 A | * 12/1970 | Phelan et al. | 171/39 |
| 3,632,919 A | * 1/1972 | Chatagnier | 200/61.42 |
| 3,658,132 A | 4/1972 | Akesson | |
| 3,690,049 A | 9/1972 | Roberson | |
| 3,731,477 A | 5/1973 | Coon | |
| 3,739,854 A | 6/1973 | Janssen | |
| 3,800,518 A | 4/1974 | Baggiolini et al. | |
| 3,858,660 A | 1/1975 | Wadsworth | |
| 3,970,150 A | * 7/1976 | Gibson et al. | 171/56 |
| 4,136,509 A | 1/1979 | Lenker et al. | |
| 5,560,190 A | 10/1996 | Ottaway | |
| 5,924,271 A | 7/1999 | Truffaux | |

FOREIGN PATENT DOCUMENTS

| | | | |
|---|---|---|---|
| EP | 0502789 | | 9/1992 |
| EP | 1284105 | | 2/2003 |
| GB | 2432096 | | 5/2007 |
| JP | 63049062 A | * | 3/1988 |
| JP | 03/072812 | | 3/1991 |
| JP | 05/015235 | | 1/1993 |
| JP | 06178608 A | * | 6/1994 |
| JP | 00/236728 | | 9/2000 |
| JP | 01/025317 | | 1/2001 |
| WO | WO97/42805 | | 11/1997 |
| WO | WO01/58245 | | 8/2001 |

OTHER PUBLICATIONS

Examination Report from corresponding Great Britain application No. GB1011399.1 dated Oct. 19, 2010.

Examination Report from corresponding New Zealand Application No. 586897 dated Jul. 22, 2010.

* cited by examiner

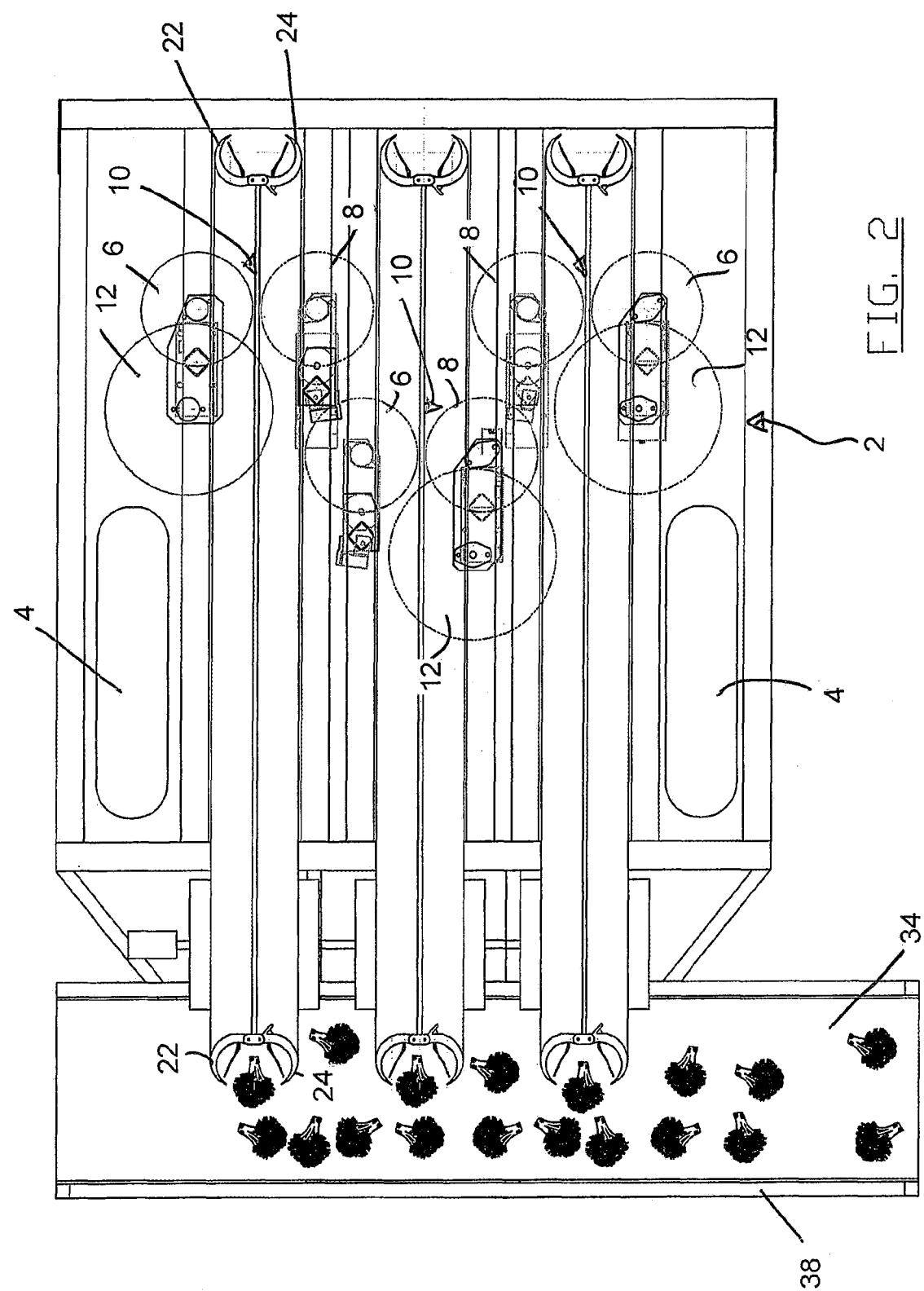

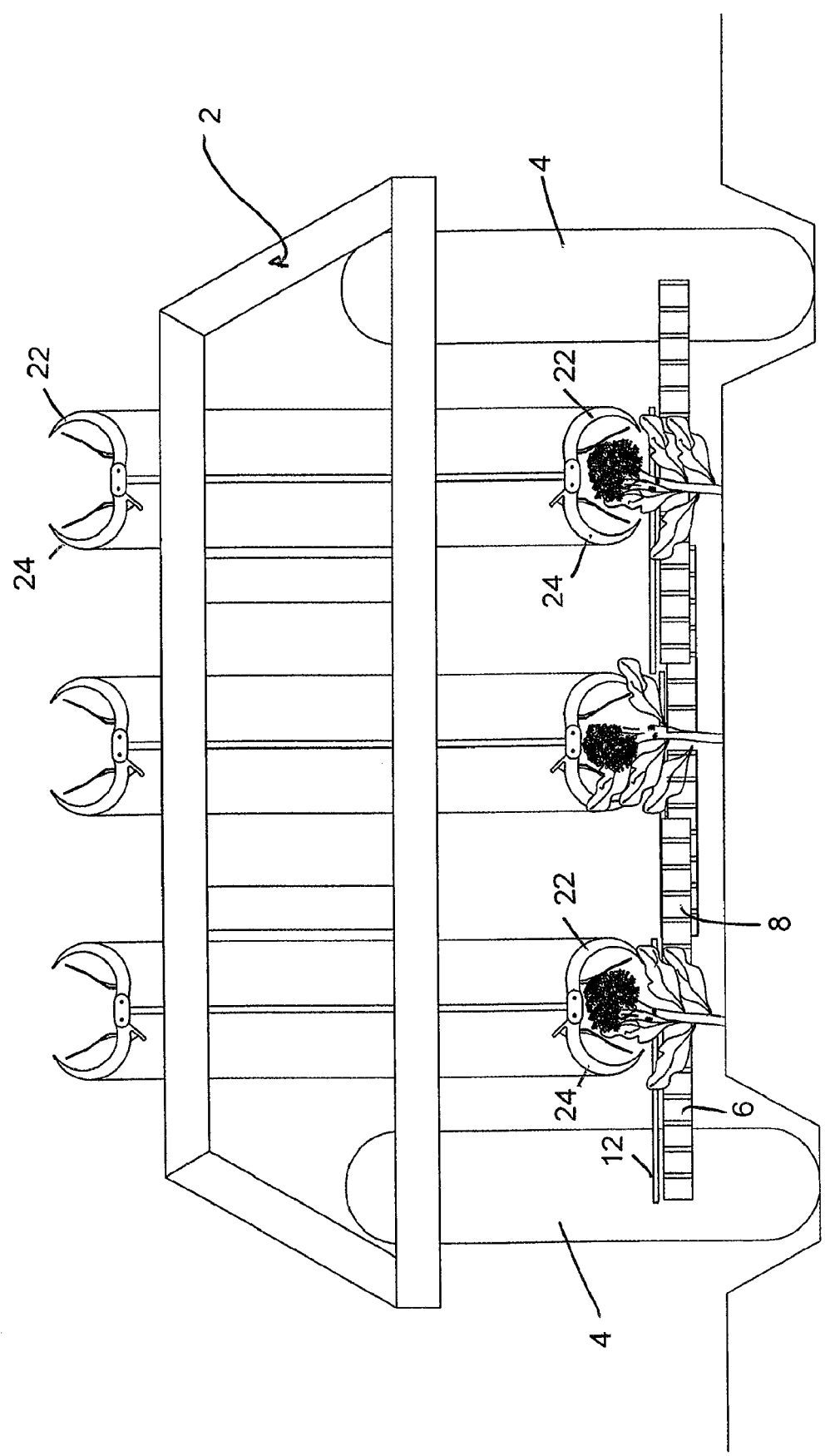

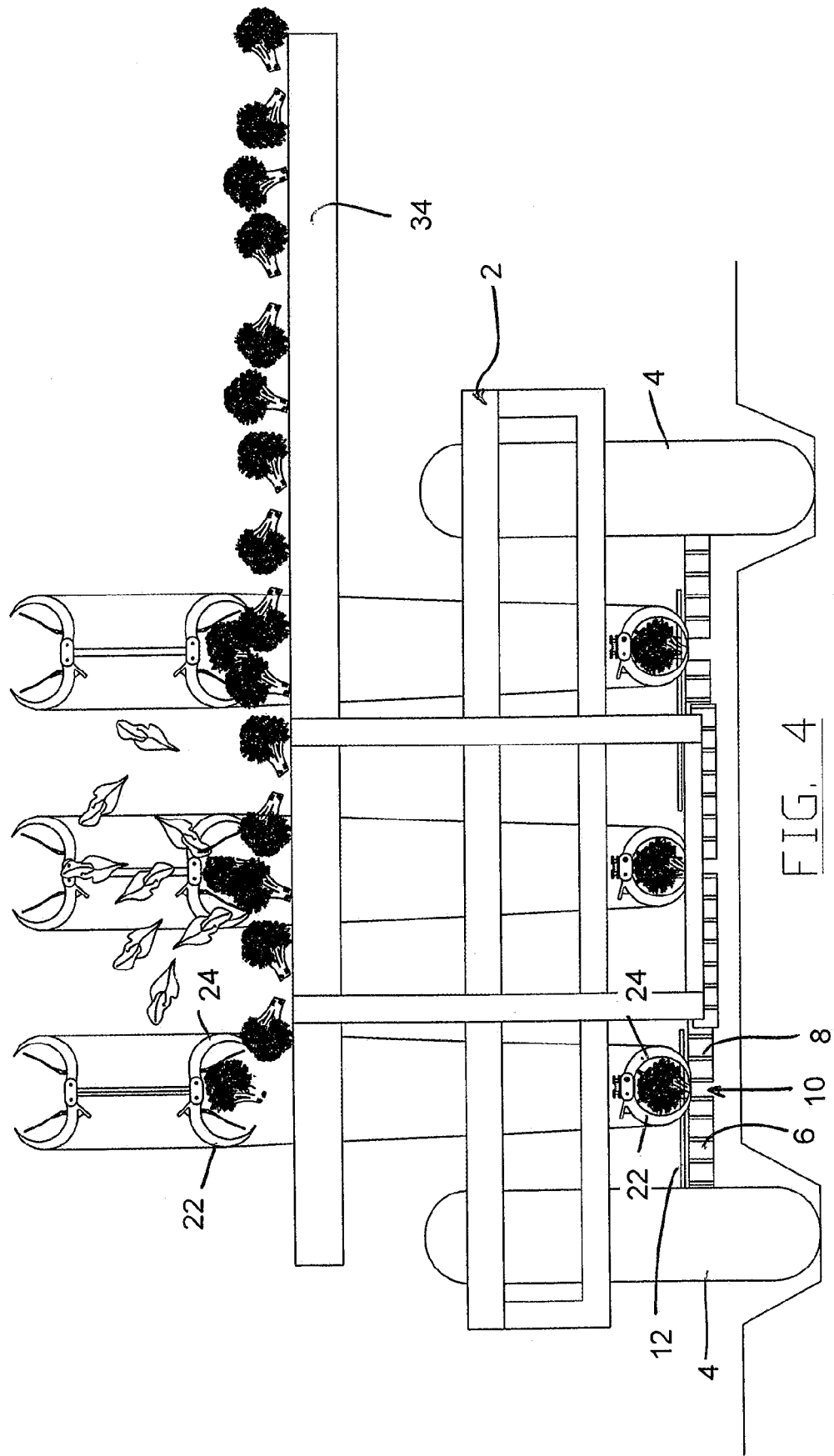

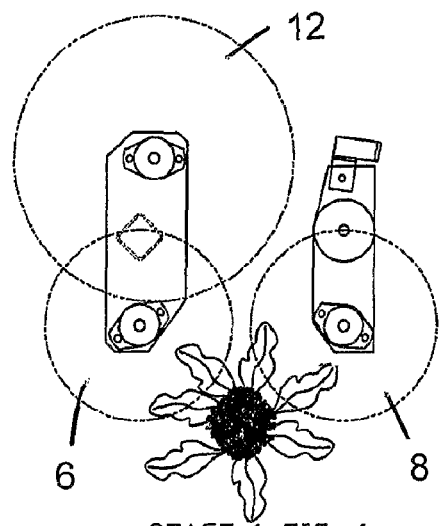
STAGE 1 FIG. 6a
PLAN VIEW
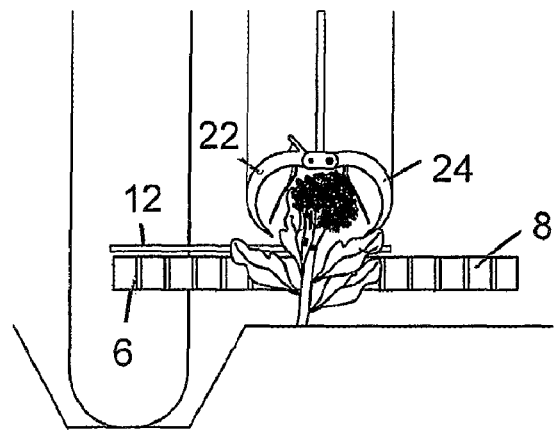
STAGE 1 - FIG. 6b
FRONT VIEW
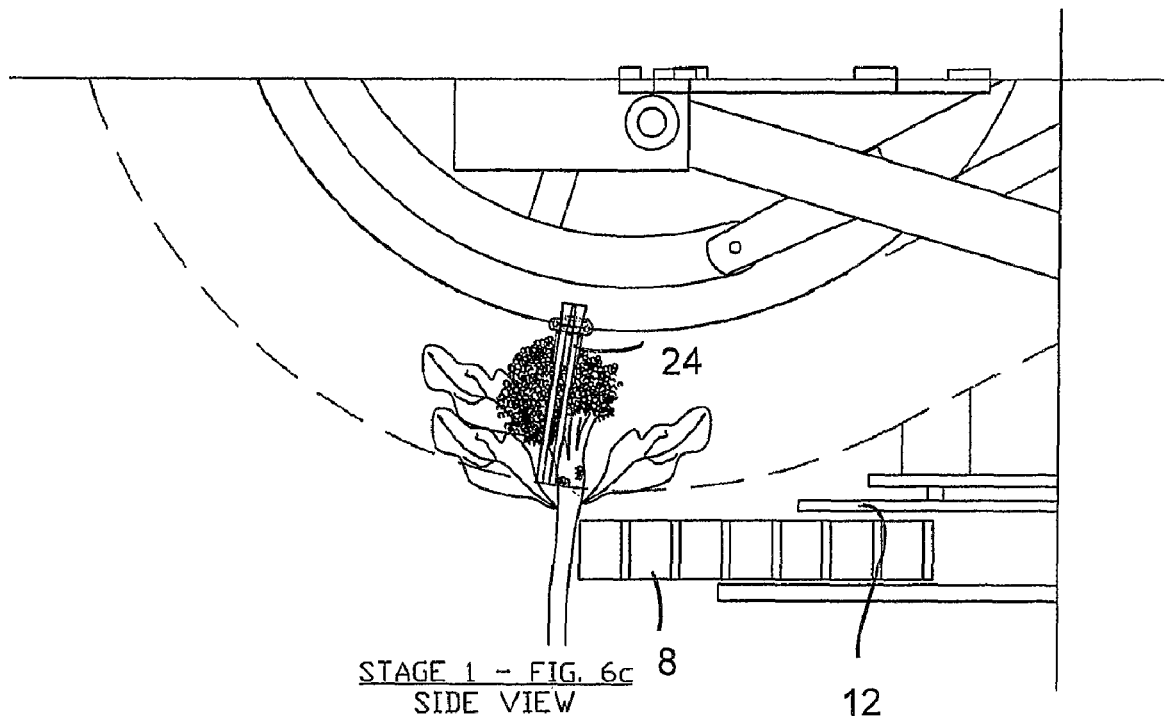
STAGE 1 - FIG. 6c
SIDE VIEW

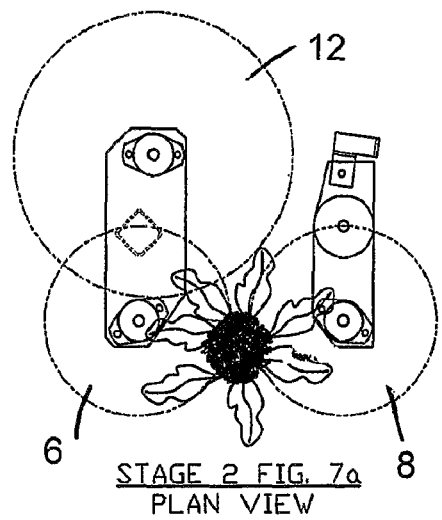
STAGE 2 FIG. 7a
PLAN VIEW
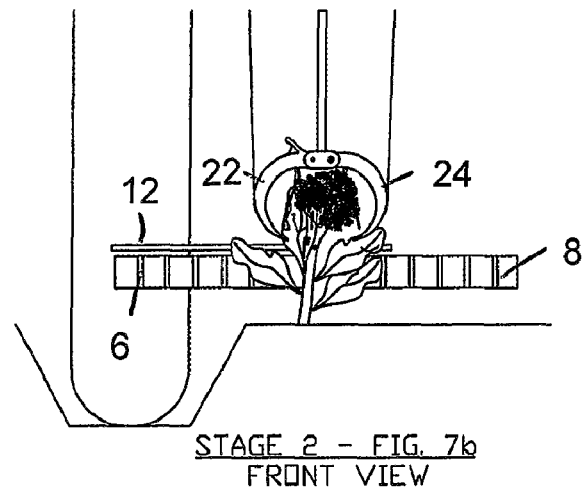
STAGE 2 - FIG. 7b
FRONT VIEW
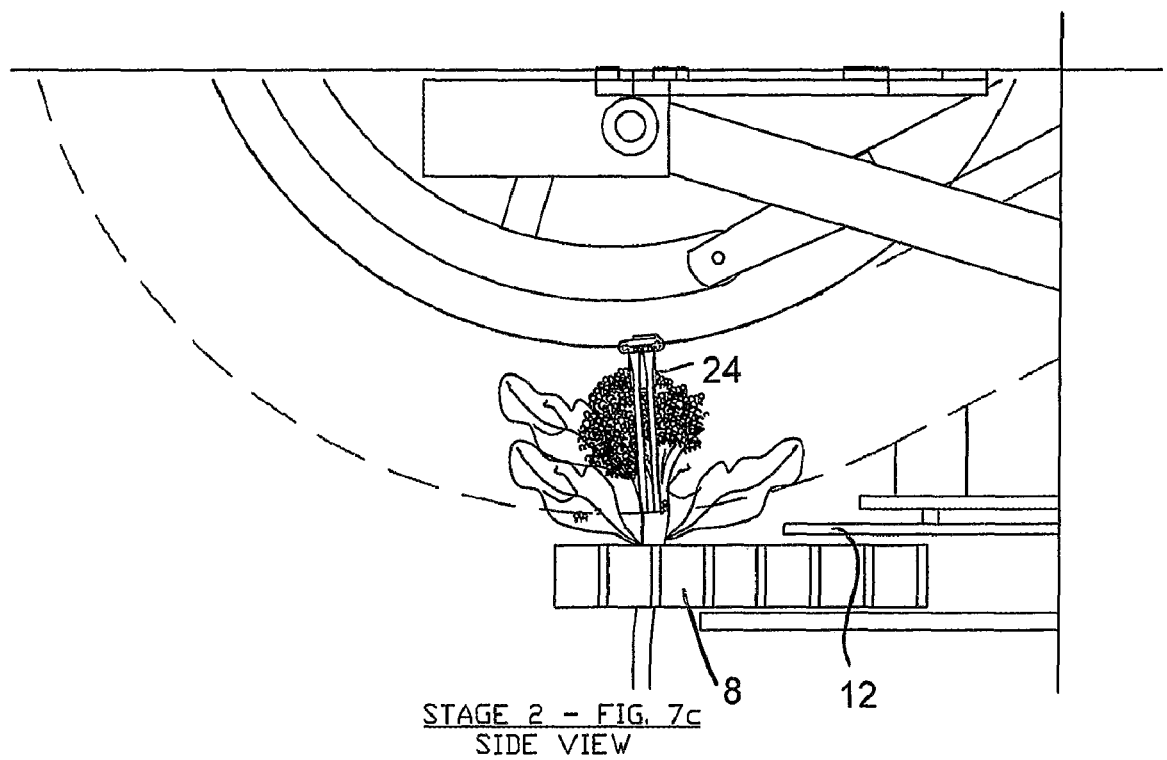
STAGE 2 - FIG. 7c
SIDE VIEW

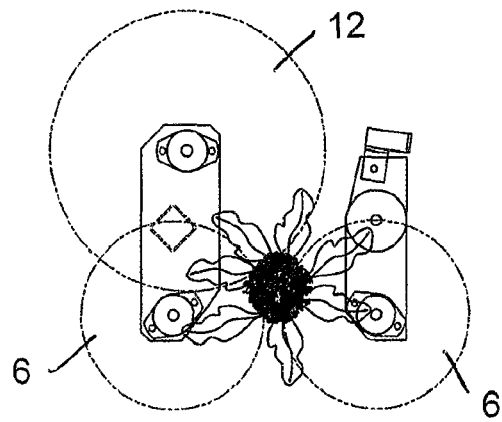
STAGE 3 FIG. 8a
PLAN VIEW
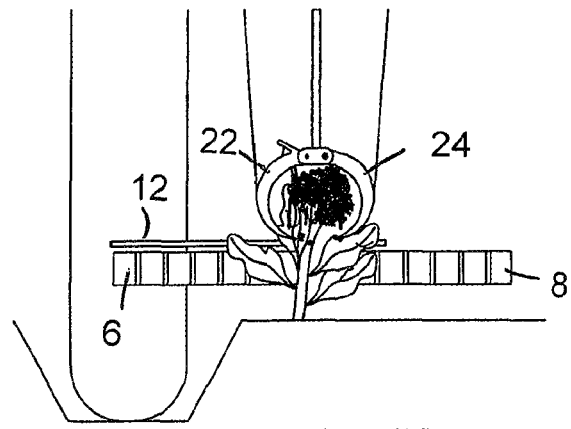
STAGE 3 - FIG. 8b
FRONT VIEW
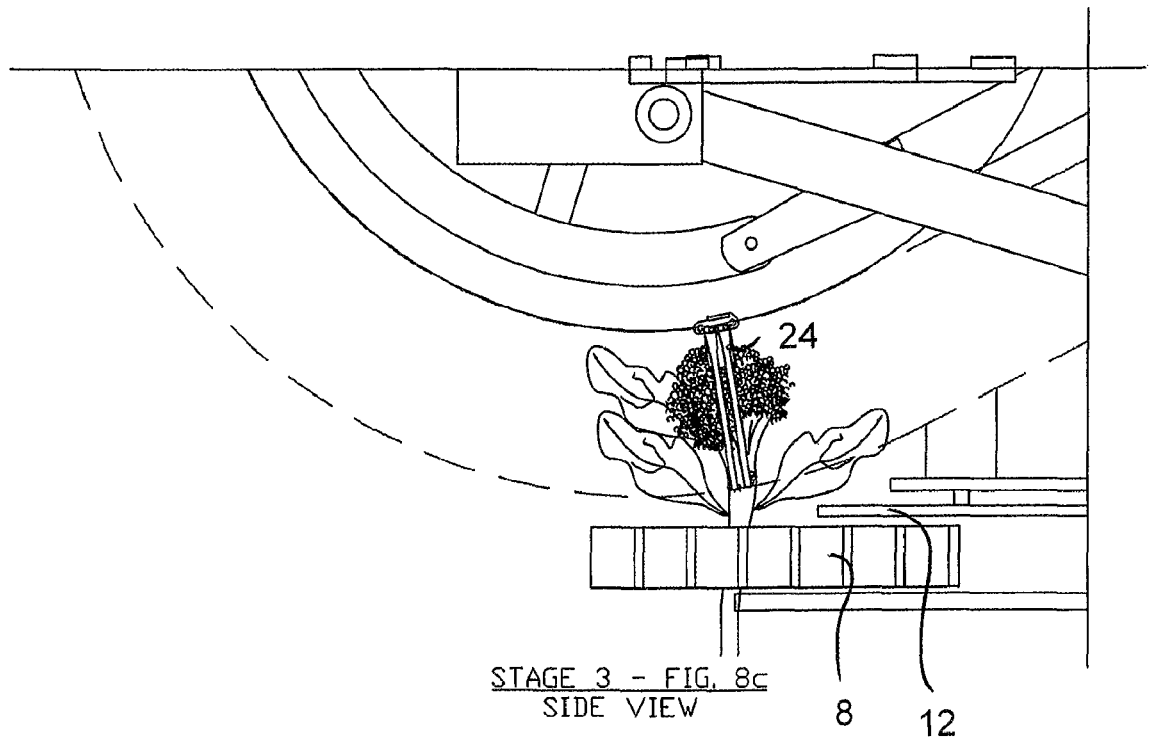
STAGE 3 - FIG. 8c
SIDE VIEW

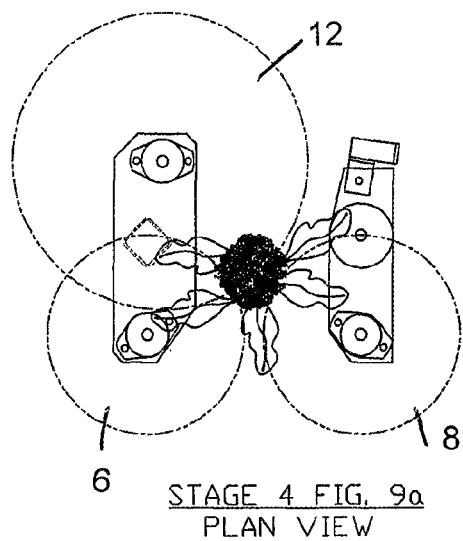
STAGE 4 FIG. 9a
PLAN VIEW
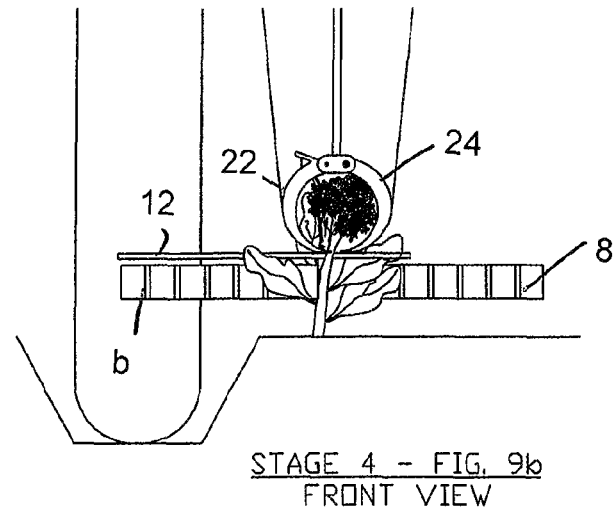
STAGE 4 - FIG. 9b
FRONT VIEW
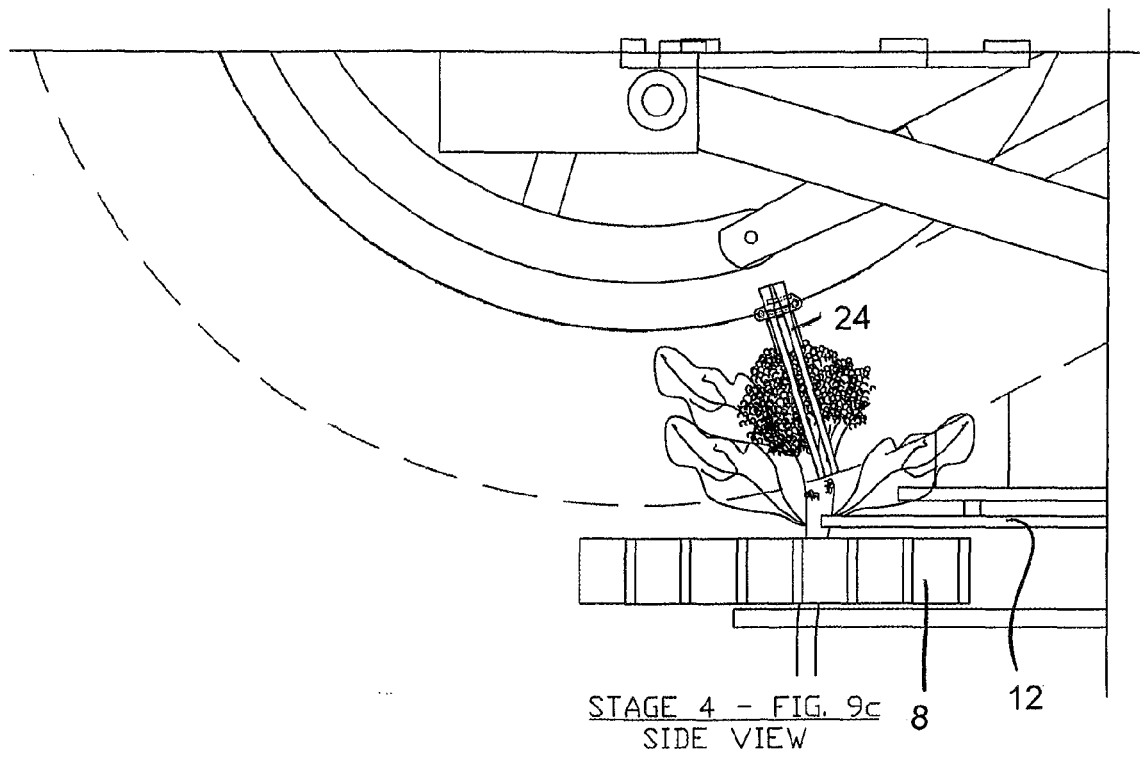
STAGE 4 - FIG. 9c
SIDE VIEW

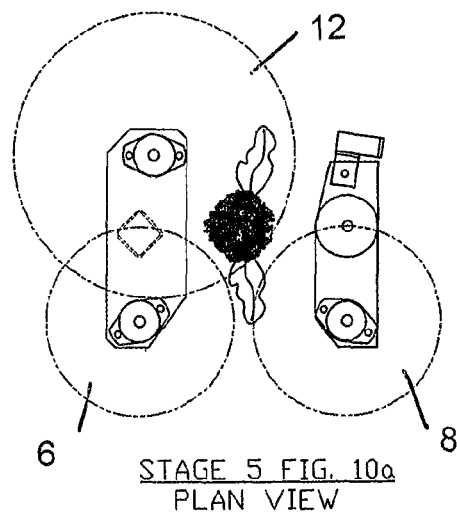
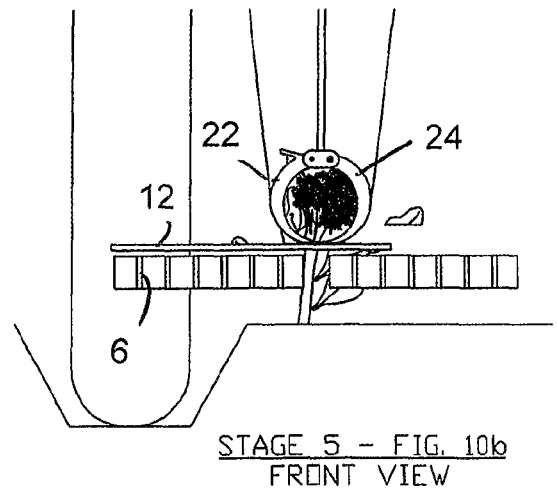
STAGE 5 FIG. 10a
PLAN VIEW
STAGE 5 - FIG. 10b
FRONT VIEW
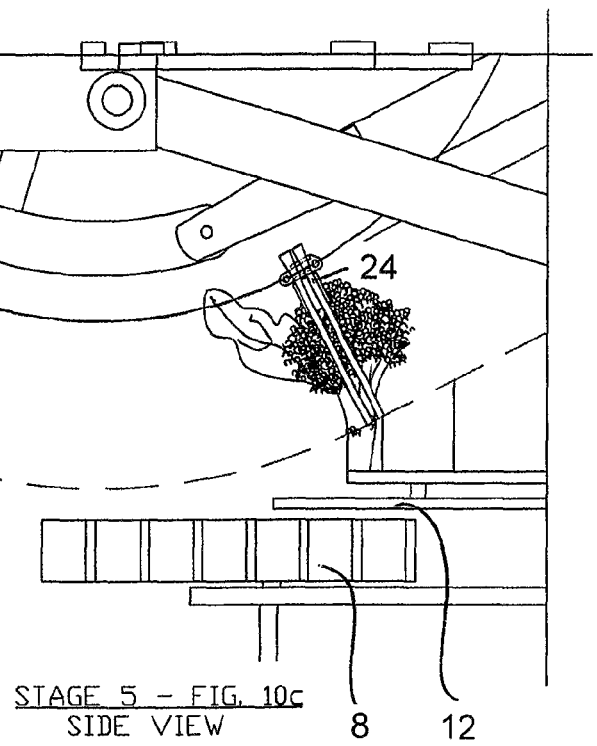
STAGE 5 - FIG. 10c
SIDE VIEW

US 8,136,335 B2

BRASSICA HARVESTER

BACKGROUND OF THE INVENTION

1. Field of the Invention

The present invention relates to the harvesting of vegetable crops and more particularly to the harvesting of the heads or flowers of plants of the *brassica* family, broccoli for example.

2. Description of the Prior Art

The harvesting of heads of plants within the *brassica* family presents particular problems because the head tends to be enclosed within a body of dense foliage. Prior attempts to design mechanical harvesters for these crops, particularly broccoli, have not been successful due to the difficulty of separating the heads from the significant amounts of foliage which arise when the stem of the plant is severed close to the ground. The difficulties are such that broccoli still tends to be harvested manually and this has proven still to be more effective than mechanical methods involving the processing of the substantial amounts of unwanted foliage.

SUMMARY OF THE INVENTION

According to the invention there is provided a harvester for *brassicas*, the harvester being movable along a plant row and comprising means engageable with the plant to align the plant in a generally upright condition for harvesting, means for cutting the plant stem adjacent to the head, and transport means for moving foliage away from the zone of the plant head so as to isolate the plant head prior to cutting of the stem and to carry the head following cutting to a discharge zone.

In a preferred embodiment of the invention, the transport means comprises opposed conveyor fingers progressively movable between open and closed positions, wherein when in an open position in which ends of the fingers are spaced the fingers are movable along a path to engage foliage adjacent the plant head and displace foliage away from the zone of the head, and in a closed position the fingers engage beneath the head so as to carry the head when cut to the discharge zone.

Advantageously, the fingers form an endless transport conveyor driven in synchronism with movement of the harvester along the plant row, the displacement of foliage and retention of the cut head occurring along a lower run of the conveyor. The opposed fingers are mounted for pivotal movement between their open and closed positions and the fingers are of arcuate form whereby when the fingers are in their closed position part of the conveyor defined by those fingers is substantially of tubular form in which the cut plant heads are retained and transported to the discharge zone.

In the preferred embodiment of the present invention, the lower run of the conveyor inclines upwardly from the plant alignment and cutting means to the discharge zone.

Advantageously the alignment means comprises a pair of alignment wheels driven for rotation about a vertical axis, the wheels being laterally spaced to define a narrowing passage to bring a plant into an upright condition, the cutting means being adjacent the wheels for cutting the stem of a plant aligned by the wheels. Preferably the cutting means is a rotary cutter.

Advantageously, the alignment wheels are movable apart laterally against a bias to permit self-adjustment to accommodate different thicknesses of plant stem.

At the discharge zone, the fingers are moved to their open position to allow the cut heads to fall from the conveyor onto a discharge device such as a discharge conveyor. As it is inevitable that some foliage will have been carried with the cut plant heads, means are provided at the discharge zone to separate such foliage from the cut plant heads. Advantageously such means comprises a blower to blow the foliage, which is lighter than the cut plant heads, away from the discharge conveyor.

In one practical form of the invention, the harvester is configured to harvest the entire crop in a single pass along the crop row and thereby in a non-selective manner. In an alternative form however the harvester can be configured to harvest crop selectively along the crop row dependent on the maturity of individual plants. In this form the harvester incorporates a sensor system for determining the maturity of individual crop heads such that when a particular crop head is identified as being insufficiently mature for harvesting that plant is bypassed to remain in the ground for harvesting at a subsequent stage when it has achieved maturity. Bypassing of the immature plant is achieved by maintaining the relevant conveyor fingers open as they pass along the plant and by rendering the cutting means inoperative such as by displacing it away from the plant. Assessment of the plant maturity/immaturity can be achieved by means of a camera system associated with software to discriminate between images of mature and immature crop heads.

BRIEF DESCRIPTION OF THE DRAWINGS

An embodiment of the invention will now be described by way of example only with reference to the accompanying diagrammatic drawings in which:

FIG. 2 is a plan view;

FIG. 3 is a view from the front;

FIG. 4 is a view from the rear;

FIGS. 6 to 10 show highly schematically the manner in which fingers of the transport conveyor displace foliage from the zone of the plant hear prior to cutting and the engagement of the cut plant head by the fingers.

DESCRIPTION OF THE PREFERRED EMBODIMENTS

Figure 1A:
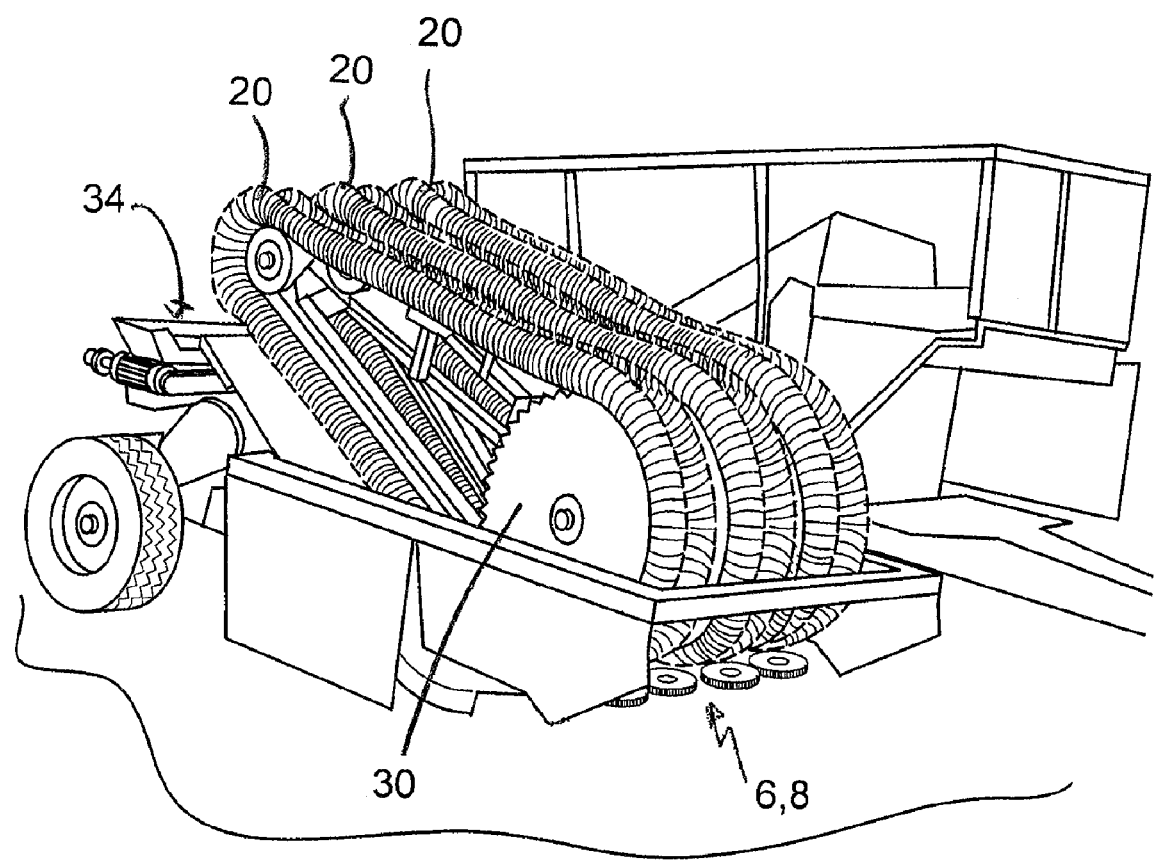
FIG. 1A is a diagrammatic perspective view showing the overall configuration of the harvester.

The preferred embodiment of the present invention relates to a harvester for harvesting broccoli grown in parallel rows along a bed, typically two or three rows. The components for harvesting one of the rows will be described in detail and it is to be understood that these components are replicated within the harvester for each of the rows. The particular harvester shown in the drawings is configured to harvest three rows simultaneously.

Figure 1B:
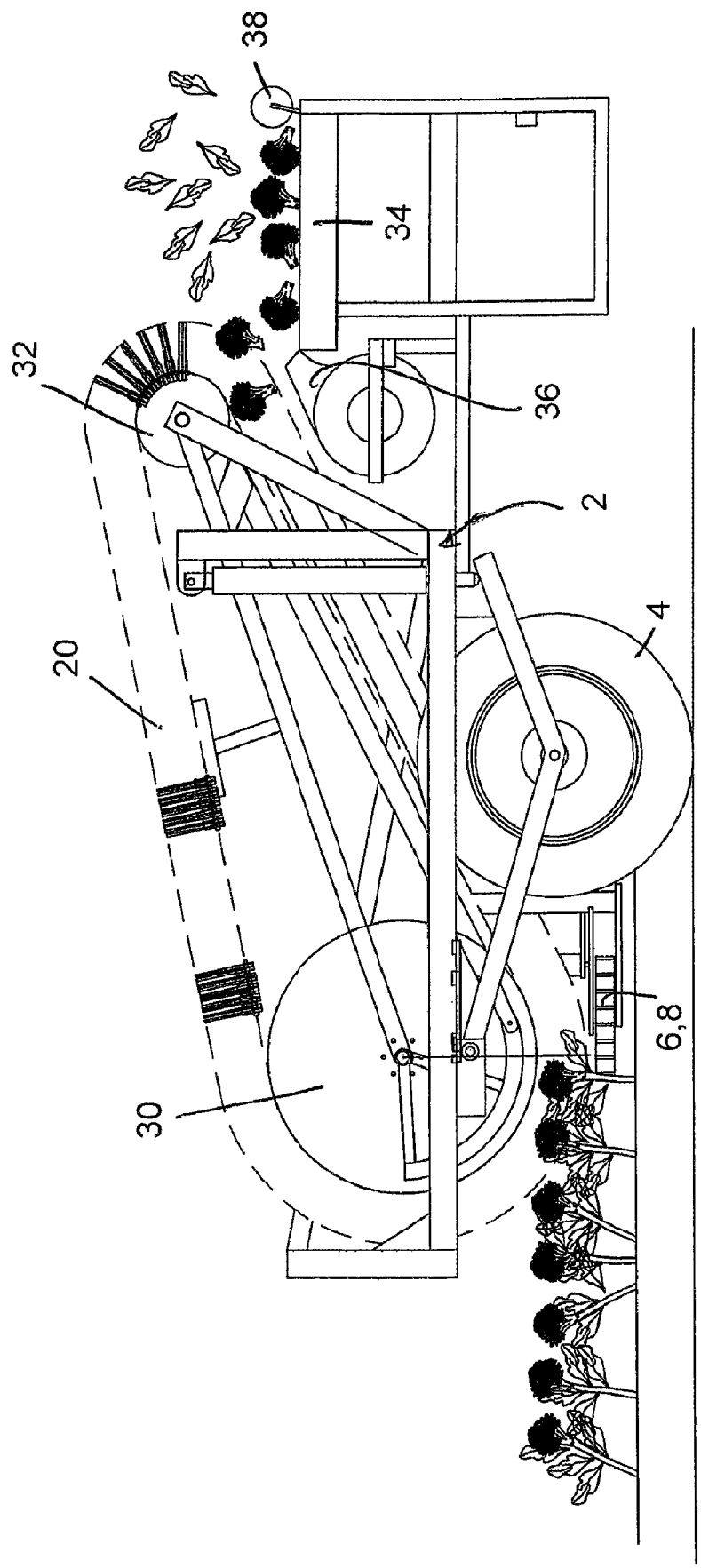
FIG. 1B is a view of the harvester from one side with some of the protective and other structure shown in FIG. 1A removed so as to better illustrate the detailed construction of the harvester.

The overall configuration of the harvester is shown in FIG. 1A and the more detailed construction is shown in FIG. 1B and will be principally described with reference to that Figure and the subsequent Figures. It is to be noted that for clarity of illustration certain of the features shown in FIG. 1A are omitted from FIG. 1B but these are not critical to a proper understanding of the invention.

The harvester comprises a main frame 2 having wheels 4 (see FIG. 1B) which engage the ground at either side of the crop bed. The frame 2 is supported from the wheels 4 by a hydraulic suspension system which allows the height of the frame 2 to be adjusted relative to the crop bed which is normally raised relative to the ground. The harvester is designed to be towed behind a prime mover such as a tractor, and driven components of the harvester are preferably driven by hydraulic motors powered by a hydraulic pump driven from the PTO of the tractor. Electrical components within the harvester can be powered from the electrical system of the tractor.

For each row to be harvested, the principal components consist of a pair of forward plant alignment wheels 6, 8 each rotatable about a vertical axis and thereby in a horizontal plane. The wheels 6, 8 are arranged relatively close to the surface of the bed and are spaced apart laterally so that the adjacent circumferences of the two wheels define a passage 10 which narrows significantly from the forward end of the two wheels to a throat between the two wheels. General growing conditions of broccoli often cause the plant stems to grow at an angle and as the plants enter the passage 10 between the two wheels 6, 8, and pass through the passage (as a result of the advance of the harvester along the crop bed), the wheels 6, 8 straighten the stems to an approximately vertical position and also ensure that the stems are located approximately on a central longitudinal axis between the two wheels 6, 8. Each of the wheels 6, 8 is movable laterally against a spring bias between an inner position in which the adjacent circumferential portions of the wheels 6, 8 in the narrowest portion of the throat are spaced by a distance corresponding approximately to the smallest diameter stems likely to be encountered, but as larger diameter stems are encountered the wheels 6, 8 are forced apart against their spring bias to allow passage also of those stems without causing blockage.

A rotary cutter 12 in the form of toothed cutting disc is mounted to the support structure of one of the wheels 6, 8. The rotary cutter 12 is mounted for rotation about a vertical axis spaced rearwardly of the axis of the associated wheel, with the cutter being in a plane above that of the wheel. The cutter 12 is of a diameter substantially larger than that of its associated wheel and its forward cutting edge extends across the central longitudinal axis behind the throat of the two wheels whereby to cut the plant stems while the head of the plant is being held as will be described in detail below; it will be understood that the diameter of the cutter 12 is such that it will extend across the central longitudinal axis even in a laterally outer position of the two wheels 6, 8 assumed when the wheels have been forced further apart by larger diameter stems.

A significant aspect of the harvester is the provision of means for displacing most of the leaves away from the zone of the head and for encapsulating the head so that when the plant stem is cut by the rotary cutter 12, the head, together with only relatively small amounts of foliage, is transported away from the cutting zone for subsequent separation and discharge.

Figure 5:
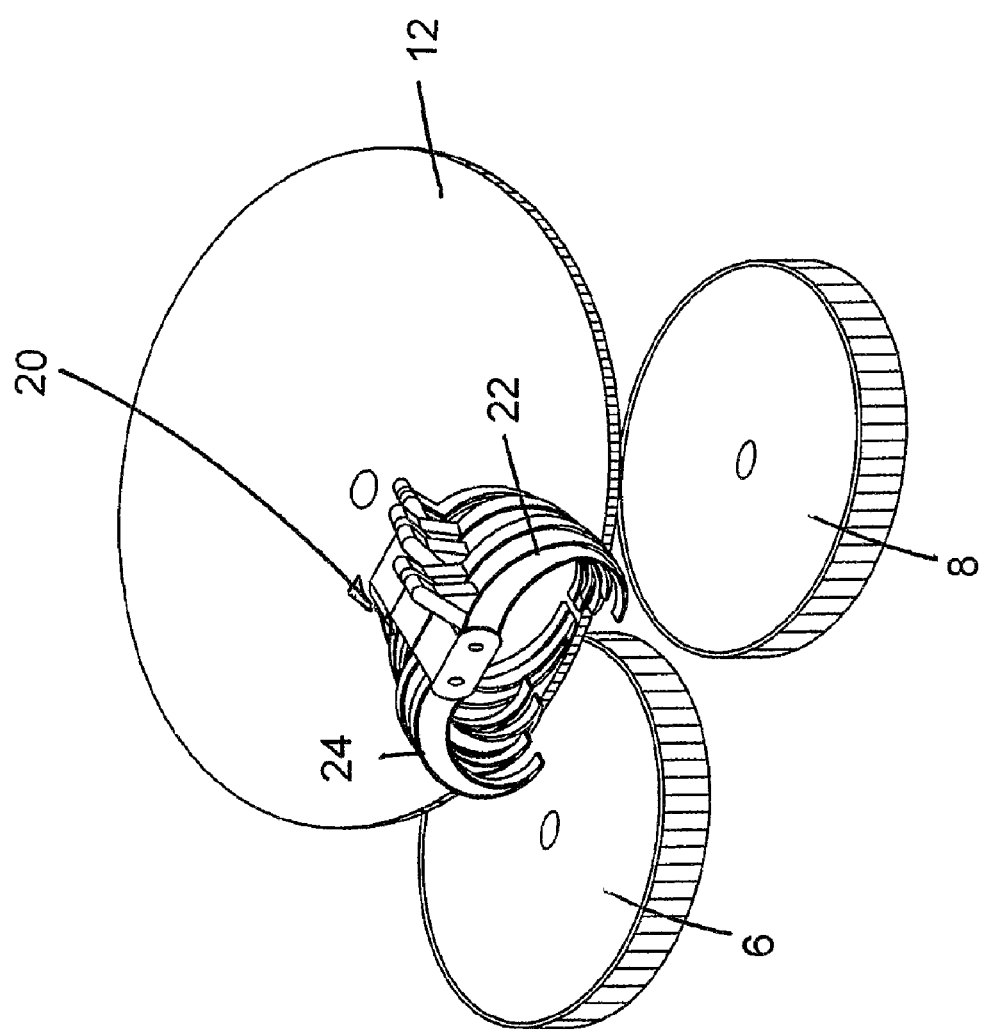
FIG. 5 shows schematically a segment of an endless transport conveyor.

In the embodiment shown this is achieved by means of an endless conveyor 20 principally formed by two opposed rows of curved fingers 22, 24 which pivot in a controlled manner between an outer or open position in which the outer ends of the opposed fingers are spaced and an inner or closed position in which the outer ends of the opposed fingers are adjacent to define an essentially tubular closed configuration. As will be described in detail subsequently, the movement of the fingers from their open to the closed position displaces the foliage and encapsulates the head. When the stem of the encapsulated head has been cut, the cut head is retained and transported for discharge at the rear of the harvester when the fingers are returned to their open position. A segment of the conveyor is shown schematically in FIG. 5. In the preferred embodiment, the endless conveyor is substantially as described in U.S. Pat. No. 740,393, the disclosure of which is hereby incorporated by reference. However the manner in which the rows of adjacent fingers are moved between their open and closed configuration will be described subsequently.

The operative part of the conveyor 20 is its lower run. The alignment wheels 6, 8 and rotary cutter 12 are positioned at the forward end of the lower run of the conveyor. At its forward end, the conveyor passes around a large diameter wheel 30 and at its rear end the conveyor passes around a smaller diameter wheel 32 which is adjacent the rear of the harvester and which is raised relative to the forward wheel 30. Accordingly, the main linear section of the lower run of the conveyor 20 rises progressively from the forward end of the harvester to the rear end of the harvester. When the fingers 22, 24 are moving along the lower circumference of the large wheel 30 at the forward end of the conveyor they are moving along a descending path towards the alignment wheels 6, 8 and rotary cutter 12. While traversing this descending path, the fingers 22, 24 are moving from their open to their closed positions although they do not reach their fully closed positions until they are rearwardly of the leading edge of the cutter 12 and thereby after cutting of the stem has taken place. This descending movement of the fingers 22, 24 while the fingers are still open (but moving towards their closed position) causes the fingers to push down the foliage adjacent the plant head and for the plant head to enter into the interior of the conveyor between the open fingers. By the time the stem is engaged with the rotary cutter 12, the head is within the interior of the conveyor with most of the surrounding foliage pushed to the outside of the conveyor by the descending and closing fingers. Although some foliage will enter the interior of the conveyor with the plant head, it is not in a substantial amount and is able easily to be separated from the cut plant heads at the discharge end of the conveyor as will subsequently be described. Following cutting of the stems which takes place very close to the underside of the lower run of the conveyor 20 and hence to the lower edges of the fingers 22, 24, the fingers are fully closed to retain the cut heads for transport to the rear end of the harvester for discharge and separation of the crop.

The actions of the fingers to press down the foliage around the plant head and to enclose the plant head are illustrated highly schematically in FIGS. 6 to 10 which show (each in plan view, front view, and side view) successive stages in the actions described above. It is to be understood that whereas in the side views of FIGS. 6 to 10 only one set of fingers 24 is shown for simplicity of illustration, in fact the sets of fingers are closely spaced in succession in the conveyor as will be evident from the segment illustrated in FIG. 5 and also from FIG. 1B.

The speed of the plant alignment wheels 6, 8 and conveyor 20 are synchronised with the speed of the harvester over the ground to ensure synchronised operation using appropriate sensors which detect the speed of the harvester along the ground and also the rotation of the shafts carrying the wheels 4.

As previously mentioned, in a preferred embodiment the endless conveyor 20 is substantially as described in Australian patent no. AU 740393. This patent describes the manner in which opposed sets of fingers are pivotally mounted to inter-linked blocks at the inner side of the conveyor. This patent also describes how the fingers co-operate with fixed control members or cam tracks positioned along the path of movement of the conveyor to cause controlled movement between their open and closed positions, and how opposed sets of fingers are linked, such as by a geared connection, for simultaneous movement.

In the preferred embodiment of the invention, the cam tracks are positioned to cause the fingers 22, 24 to move towards their closed position as they traverse around the lower part of the large forward wheel 30. As the lower run of the conveyor 20 approaches the smaller wheel 32 at the rear end of the harvester, the cam tracks cause the fingers 22, 24 to open again to permit discharge of the cut plant heads onto a transverse conveyor belt 34 for discharge from the harvester.

At the discharge end of the lower run of the conveyor 20, to permit separation of the heads from cut foliage which has been transported within the closed conveyor, a powerful blower 36 is positioned to blow the foliage along a trajectory across and over the transverse conveyor 34, to fall onto the ground behind the harvester. The cut plant heads, being much heavier than any such foliage will fall directly onto the transverse conveyor 34 and will not be effected by the blower, a bumper rail 38 being provided to stop larger heads from rolling off the rear edge of the transverse conveyor 34 and onto the ground. The cut plant heads are carried by the transverse conveyor to a "pick-off" table where inspection takes place so that any faulty product and any remaining debris can be moved, the product then being fed into bulk bins travelling beside the harvester.

It is to be noted that as the plant stems are not cut very close to the ground, following cutting, sufficient of the plant remains in the ground and can grow for a fodder crop or can be mulched back into the soil.

In the particular harvester shown in the drawings which are designed to harvest three rows of crop, it will be seen from FIG. 2 that the transverse conveyor 34 receives crop from the three endless transport conveyors 20. This figure also shows that the crop alignment wheels 6, 8 and rotary cutter 12 for the centre row is displaced rearwardly of those for the two outer rows. This rearwards displacement results from the need to fit the components at a predetermined lateral spacing corresponding to the spacing of the rows, but it does not effect the operation. In practice, it may also be preferred for the forward wheel 30 of the centre conveyor 20 to be displaced rearwardly of those of the two outer conveyors, to correspond to the rearwards displacement of the associated crop alignment wheels and cutter.

Figure 11:
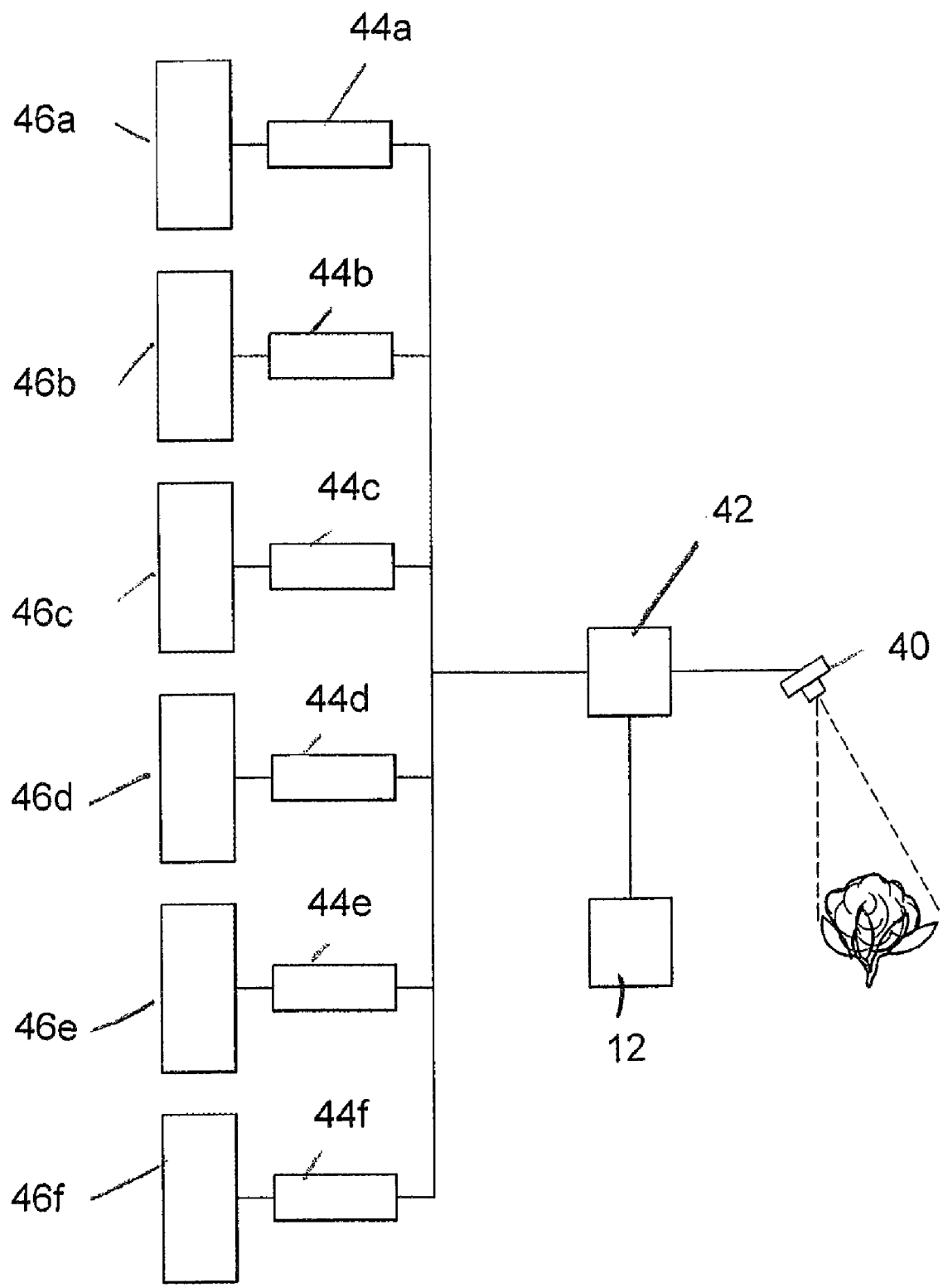
FIG. 11 shows schematically a system enabling selective harvesting depending on individual plant maturity.

Although in the embodiment described, movement of the fingers of the transport conveyor 20 between their open and closed positions is controlled by fixed cam tracks, in an alternative the movement can be controlled by selectively operable actuators which control individual cam track segments to move between inoperative positions in which the conveyor fingers remain open and operative positions in which they cause the fingers to close onto a plant as described above. In this way the harvester can be configured to selectively harvest crop according to its maturity. In particular, cameras mounted near ground level can take images of the crop heads, with appropriate software being used to identify and differentiate between mature and immature heads. Identification of a mature head, indicating that that head is to be harvested, will trigger operation of the corresponding conveyor fingers to close onto the plant in the manner described for harvesting. On the other hand, a response indicating a head having insufficient maturity for harvesting will result in the relevant fingers remaining open and will also trigger a retraction of the rotary cutter 12 whereby that plant will be bypassed in the harvesting process and will remain intact for further development and subsequent harvesting. The system for enabling selective harvesting is illustrated schematically in FIG. 11 and comprises a crop camera, an image processor 42, actuators 44a-44f controlled in response to the processor 42, and cam track segments 46a-46f movable by the actuators; the cam track segments are shown highly schematically and in practice will vary in length and configuration according to the section of the conveyor 20 with which they are associated.

Although the invention has been particularly described with reference to the harvesting of broccoli, a harvester constructed in accordance with the general principles described above, is suitable for harvesting other *brassicas*, for example cauliflowers. It will however be understood that for a usage such as that, the fingers of the transport conveyor will need to be of a larger diameter than those required for a broccoli harvester in order to handle the larger size crop heads present in the cauliflower.

The embodiment has been described by way of example only and modifications are possible within the scope of the invention. For example, in an alternative alignment of the plant stems for cutting could be effected by opposed endless driven belts which engage the plant stems. Moreover, the detailed construction of the transport conveyor could differ from that shown.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A harvester for *brassicas*, the harvester being movable along a plant row and comprising means engageable with a plant to align the plant in a generally upright condition for harvesting, means for cutting a stem of the plant, and transport means for moving foliage away from the zone of a head of the plant so as to isolate the plant head prior to cutting of the stem and to carry the head following cutting to a discharge zone, wherein the transport means comprises opposed conveyor fingers progressively movable between open and closed positions, wherein when in an open position in which ends of the fingers are spaced the fingers are movable along a path which includes a descending portion to engage foliage adjacent the plant head and displace foliage away from the zone of the head prior to cutting, and in a closed position the fingers engage the head from beneath so as to carry the head when cut to the discharge zone.

2. A harvester according to claim 1, wherein the fingers form an endless transport conveyor driven in synchronism with movement of the harvester along the plant row, the displacement of foliage and retention of the cut head occurring along a lower run of the conveyor.

3. A harvester according to claim 2, wherein the lower run of the conveyor inclines upwardly from the plant alignment means and cutting means to the discharge zone.

4. A harvester according to claim 2, wherein the cutting means is a rotary cutter closely adjacent to an underside of the lower run of the conveyor.

5. A harvester according to claim 1, wherein the opposed fingers are mounted for pivotal movement between their open and closed positions and the fingers are of arcuate form whereby when the fingers are in their closed position part of the conveyor defined by those fingers is substantially of tubular form in which the cut plant heads are retained and transported to the discharge zone.

6. A harvester according to claim 5, wherein at the discharge zone the fingers are moved to the open position to allow the cut heads to fall from the conveyor onto a discharge device.

7. A harvester according to claim 6 having means at the discharge zone to separate foliage from the cut plant heads.

8. A harvester according to claim 7, wherein the separating means comprises a blower to blow the foliage, which is lighter than the cut plant heads, away from the discharge device.

9. A harvester according to claim 1, wherein the alignment means comprises a pair of alignment wheels driven for rotation about a vertical axis, the wheels being laterally spaced to define a narrowing passage to bring a plant into an upright condition, and the cutting means is adjacent the alignment wheels for cutting the stem of the plant aligned by the wheels.

10. A harvester according to claim 9, wherein the alignment wheels are movable apart laterally against a bias to permit self-adjustment to accommodate different thicknesses of plant stem.

11. A harvester according to claim 1, having means for sensing the maturity of individual plants whereby when an individual plant is sensed to be insufficiently mature for harvesting the stem of that plant is not cut and the plant remains within the ground for harvesting when mature.

12. A harvester according to claim 1, wherein movement of the fingers from their open to their closed position is responsive to means for sensing the maturity of individual plants whereby if a plant is sensed to be insufficiently mature for harvesting, the conveyor fingers remain open in relation to that particular plant and the cutting means is rendered inoperative to cut the stem of that plant.

13. A harvester for *brassicas*, the harvester being movable along a plant row and comprising an endless conveyor orientated in the direction of the plant row, the conveyor being of generally tubular form defined by opposed rows of arcuate conveyor fingers movable from an open condition in which free ends of the opposed fingers are spaced so as to define a generally tubular configuration which is open at one side to a closed condition in which the free ends of the opposed fingers are adjacent to define a generally closed tubular configuration, the conveyor having an upper run and a lower run, the conveyor being configured at its forward end portion so that the fingers are in their open condition during transition from the upper run to the lower run and move downwardly onto a plant to be harvested so as to move foliage away from a head of the plant and to allow the plant head to enter an interior of the conveyor between the opposed fingers through the open side, with the fingers then moving to the closed condition beneath the head to thereby capture the plant head with the interior of the conveyor, the harvester further comprising means for cutting a stem of the plant whereby the plant head severed from the remainder of the plant can be carried by the conveyor for discharge from the conveyor when the fingers by which the head has been retained are returned to their open condition.

14. A harvester according to claim 13, wherein the fingers are pivotal between their open and closed conditions and are moved by the action of a cam system adjacent the path of the conveyor.

* * * * *